(12) United States Patent
Tagawa et al.

(10) Patent No.: US 8,677,811 B2
(45) Date of Patent: Mar. 25, 2014

(54) AIR FLOW RATE MEASURING DEVICE

(75) Inventors: Hiroshi Tagawa, Nagoya (JP);
Tomoyuki Takiguchi, Okazaki (JP)

(73) Assignee: Denso Corporation, Kariya (JP)

( * ) Notice: Subject to any disclaimer, the term of this patent is extended or adjusted under 35 U.S.C. 154(b) by 208 days.

(21) Appl. No.: 13/151,698

(22) Filed: Jun. 2, 2011

(65) Prior Publication Data
US 2011/0296904 A1 Dec. 8, 2011

(30) Foreign Application Priority Data
Jun. 2, 2010 (JP) ................................. 2010-126861

(51) Int. Cl.
*G01M 15/02* (2006.01)

(52) U.S. Cl.
USPC ........................................................ 73/114.32

(58) Field of Classification Search
USPC .............. 73/114.31, 114.32, 114.33, 114.34
See application file for complete search history.

(56) References Cited

U.S. PATENT DOCUMENTS

| | | | | |
|---|---|---|---|---|
| 5,672,822 A | * | 9/1997 | Sawada et al. | 73/202.5 |
| 5,847,275 A | * | 12/1998 | Kondo et al. | 73/202.5 |
| 5,894,088 A | * | 4/1999 | Sawada et al. | 73/204.19 |
| 6,220,090 B1 | * | 4/2001 | Kohno et al. | 73/202 |
| 6,223,594 B1 | * | 5/2001 | Takiguchi et al. | 73/204.21 |
| 6,805,002 B2 | | 10/2004 | Yonezawa | |
| 6,912,899 B2 | | 7/2005 | Satou et al. | |
| 2007/0089504 A1 | | 4/2007 | Hanzawa et al. | |

FOREIGN PATENT DOCUMENTS

| | | |
|---|---|---|
| JP | P2000-162007 A | 6/2000 |
| JP | P2001-235356 A | 8/2001 |
| JP | P2003-161652 A | 6/2003 |
| JP | 2010-8225 | 1/2010 |

OTHER PUBLICATIONS

Japanese Office Action dated May 15, 2012, issued in corresponding Japanese Application No. 2010-126861 with English translation.

\* cited by examiner

*Primary Examiner* — Eric S McCall
(74) *Attorney, Agent, or Firm* — Nixon & Vanderhye P.C.

(57) ABSTRACT

An air flow rate measuring device includes a housing, a sensor assembly, and an urging mechanism. The housing defines an internal flow passage, through which air taken in by the device passes, and the housing includes a contact surface. The sensor assembly includes a sensor chip and a contact surface. The sensor chip is configured to generate an electrical signal through a heat transfer phenomenon. The sensor assembly is inserted and fixed in the housing such that the sensor chip is exposed to the internal flow passage. The contact surface of the sensor assembly is in surface contact with the contact surface of the housing. The urging mechanism is configured to press the contact surface of the sensor assembly on the contact surface of the housing, so that the sensor assembly is fixed to the housing by the urging mechanism.

9 Claims, 5 Drawing Sheets

AIR FLOW RATE MEASURING DEVICE

CROSS REFERENCE TO RELATED APPLICATION

This application is based on and incorporates herein by reference Japanese Patent Application No, 2010-126861 filed on Jun. 2, 2010.

BACKGROUND OF THE INVENTION

1. Field of the Invention

The present invention relates to an air flow rate measuring device that is disposed in an intake passage to an engine to measure a flow rate of air suctioned into the engine.

2. Description of Related Art

Conventionally, a thermal-type air flow rate measuring device that is disposed in an intake passage to an engine to take in a part of air flowing through the intake passage, and that measures a flow rate of air suctioned into the engine by generating a heat transfer phenomenon between the device and the air which has been taken in, is widely known. This previously proposed air flow rate measuring device includes a housing that defines an internal flow passage, through which the taken-in air passes, and a sensor chip that is disposed in the internal flow passage. The measuring device generates a heat transfer phenomenon between the device and the taken-in air by the sensor chip, and produces an electrical signal according to an air flow rate.

In recent years, in the production of the air flow rate measuring device, for convenience in production, a method, whereby a sensor assembly having a sensor chip is assembled; the sensor assembly is inserted in and fixed to a housing; and the sensor chip is exposed to an internal flow passage, is proposed (see, e.g., JP-A-2010-008225: in JP-A-2010-008225, the sensor assembly is described as a "thermal flow sensor", and the housing is not particularly described).

The sensor assembly is a component having the sensor chip, and includes a circuit chip which processes an electrical signal that the sensor chip generates, and an external terminal for outputting the electrical signal processed by the circuit chip to, for example, an external electronic control unit (ECU).

The circuit chip and the external terminal are incorporated into the sensor assembly by insert molding, for example, and the sensor chip is fixed to a holding portion formed at the time of insert molding by an adhesive to be incorporated into the sensor assembly. The sensor chip and the circuit chip include various kinds of elements made of a semiconductor film. Generation of a heat transfer phenomenon with air, and generation and processing of the electrical signal are carried out by energization of these elements.

Fixation of the sensor assembly to the housing is by a method whereby a linear expansion of the housing easily transmits to the sensor assembly, such as bonding by the adhesive. Accordingly, due to a linear expansion difference between the sensor assembly and the housing, stress may be applied to the sensor chip or the circuit chip. As a result, if a strain is generated in the element, a resistance value of the element varies due to a piezo resistive effect, and the electrical signal obtained by the air flow rate measuring device thereby has an large error.

For this reason, a configuration that can block the transmission of linear expansion between the sensor assembly and the housing to reduce the stress applied to the sensor chip or the circuit chip is required for the air flow rate measuring device produced by inserting and fixing the sensor assembly in the housing.

SUMMARY OF THE INVENTION

The present invention addresses at least one of the above disadvantages.

According to the present invention, there is provided an air flow rate measuring device adapted to be disposed in an intake passage leading to an engine, for taking in a part of air flowing through the intake passage and generating a heat transfer phenomenon between the device and the air taken in thereby to measure a flow rate of air suctioned into the engine. The device includes a housing, a sensor assembly, and an urging mechanism. The housing defines an internal flow passage, through which the air taken in passes, and the housing includes a contact surface. The sensor assembly includes a sensor chip and a contact surface. The sensor chip is configured to generate an electrical signal through the heat transfer phenomenon. The sensor assembly is inserted and fixed in the housing such that the sensor chip is exposed to the internal flow passage. The contact surface of the sensor assembly is in surface contact with the contact surface of the housing. The urging mechanism is configured to press the contact surface of the sensor assembly on the contact surface of the housing, so that the sensor assembly is fixed to the housing by the urging mechanism.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
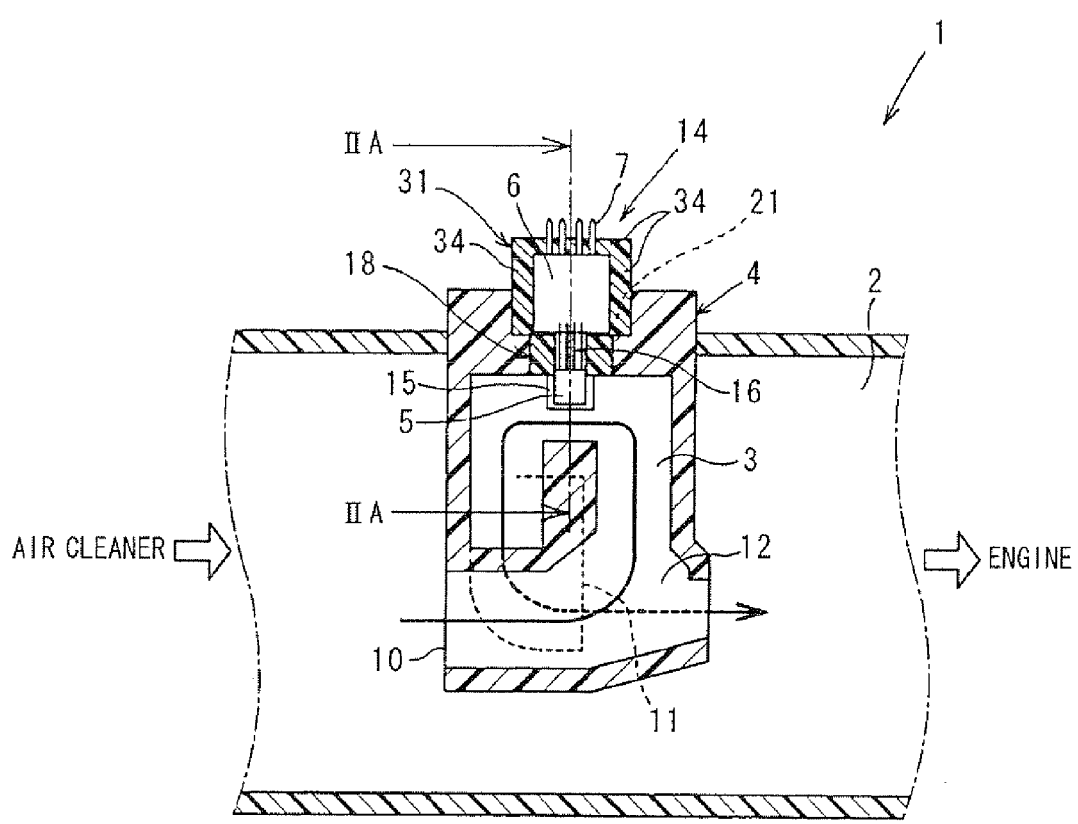
FIG. 1 is a sectional view illustrating an inside of an air flow rate measuring device in accordance with an embodiment of the invention.
Figure 2A:
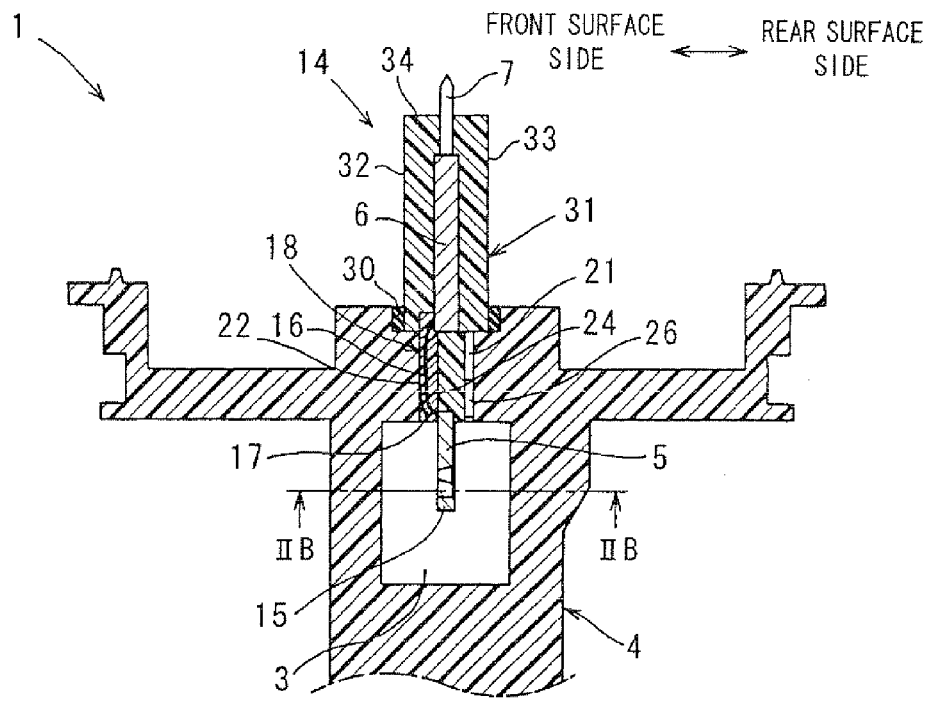
FIG. 2A is a sectional view taken along a line IIA-IIA in FIG. 1.
Figure 2B:
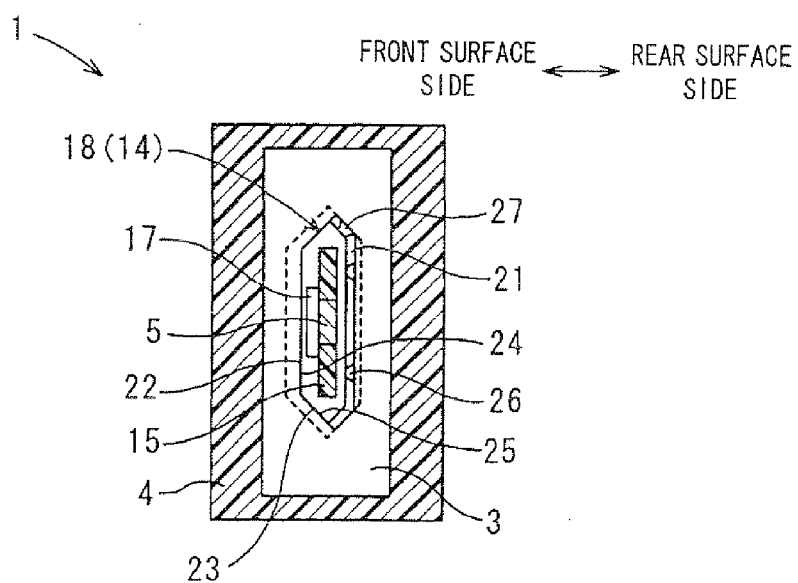
FIG. 2B is a cross-sectional view taken along a line IIB-IIB in FIG. 2A in accordance with the embodiment.

An air flow rate measuring device 1 is adapted to be disposed in an intake passage 2 leading to an engine, for taking in a part of air flowing through the intake passage 2 and generating a heat transfer phenomenon between the device 1 and the air taken in thereby to measure a flow rate of air suctioned into the engine. The device 1 includes a housing 4, a sensor assembly 14, and an urging mechanism 26 or 27. The housing 4 defines an internal flow passage 3, through which the air taken in passes, and the housing 4 includes a contact surface 24 or 25. The sensor assembly 14 includes a sensor chip 5 and a contact surface 22 or 23. The sensor chip 5 is configured to generate an electrical signal through the heat transfer phenomenon. The sensor assembly 14 is inserted and fixed in the housing 4 such that the sensor chip 5 is exposed to the internal flow passage 3. The contact surface 22 or 23 is in surface contact with the contact surface 24 or 25 of the housing 4. The urging mechanism 26 or 27 is configured to press the contact surface 22 or 23 of the sensor assembly 14 on the contact surface 24 or 25 of the housing 4, so that the sensor assembly 14 is fixed to the housing 4 by the urging mechanism 26 or 27.

The sensor assembly 14 may further include a circuit chip 6 that is configured to process the electrical signal; and a bonding part 18 that electrically connects the sensor chip 5 and the circuit chip 6 together. The contact surface 22 or 23 of the sensor assembly 14 may be formed on the bonding part 18.

The contact surface 22 or 23 of the sensor assembly 14 may be one of a plurality of contact surfaces 22 and 23 of the sensor assembly 14. The contact surface 24 or 25 of the housing 4 may be one of a plurality of contact surfaces 24 and 25 of the housing 4. The sensor assembly 14 may be in surface contact with the housing 4 at a plurality of places 22 and 23 so as to be fixed to the housing 4.

The air flow rate measuring device 1 may further include a sealing agent 30 between the housing 4 and the sensor assembly 14. The sealing agent 30 may be an elastic adhesive and configured to maintain air-tightness in the internal flow passage 3.

The sensor assembly 14 may further include an outer arrangement part 31 that is outside the housing 4. The outer arrangement part 31 may have a shape of a plate and extend in a single surface direction. The outer arrangement part 31 may include a front surface 32 and a rear surface 33, which are parallel to the surface direction; and a peripheral edge 34 that demarcates extension of the front surface 32 and the rear surface 33 in the surface direction. The outer arrangement part 31 may be resin-molded by injection of molten resin through an injection nozzle, to be integrated with another member 4 or 36. A position of the injection nozzle and an injection direction of the molten resin at a time of resin-molding of the outer arrangement part 31 may be set, such that the injected molten resin flows along the front surface 32 and the rear surface 33, after the injected molten resin collides only with the peripheral edge 34 without colliding with the front surface 32 or the rear surface 33.

The housing 4 may further include a hole 21, into which the sensor assembly 14 is fitted. A part of a surface of the housing 4 that defines the hole 21 may serve as the contact surface 24 or 25 of the housing 4. The urging mechanism 26 or 27 may be a rib 26 or 27 which is formed on the surface of the housing 4 that defines the hole 21. The sensor assembly 14 may be press-fitted into the hole 21 to be in press contact with a leading end of the rib 26 or 27 and the contact surface 24 or 25 of the housing 4.

A configuration of an air flow rate measuring device 1 in accordance with an embodiment of the invention will be described in reference to the accompanying drawings. As illustrated in FIGS. 1 to 4B, the air flow rate measuring device 1 is disposed to project into an intake passage 2 to an engine, and measures a flow rate of air suctioned into the engine.

The air flow rate measuring device 1 takes in a part of air flowing through the intake passage 2, and generates a heat transfer phenomenon between the device 1 and the taken-in air. Accordingly, the measuring device 1 directly measures a mass flow rate as an air flow rate. More specifically, the air flow rate measuring device 1 includes a housing 4 that defines an internal flow passage 3, through which the taken-in air flows, and a sensor chip 5 disposed in the internal flow passage 3. The measuring device 1 generates the heat transfer phenomenon between the device 1 and the taken-in air by the sensor chip 5, and an electrical signal in accordance with the air flow rate is produced.

The air flow rate measuring device 1 includes a circuit chip 6 that processes the electrical signal which the sensor chip 5 generates, and an external terminal 7 for outputting the electrical signal processed by the circuit chip 6 to an external electronic control unit (hereinafter referred to as an ECU: not shown). Based on the electrical signal obtained by the air flow rate measuring device 1, the ECU takes in a flow rate of air suctioned into the engine, and the ECU performs various kinds of control processing such as fuel injection control based on the attained air flow rate.

The housing 4 includes an inlet 10 that opens, for example, toward an upstream side of the intake passage 2 to take in a part of air flowing in the intake passage 2; the internal flow passage 3 through which the air taken in through the inlet 10 flows and which accommodates the sensor chip 5; and a discharge port 11 that opens toward a downstream side of the intake passage 2 and that returns the air, which has been taken in from the inlet 10 and passed through the sensor chip 5, into the intake passage 2. The sensor chip 5 generates a heat transfer phenomenon between the chip 5 and the air taken in through the inlet 10 to produce an electrical signal corresponding to a mass flow rate.

The internal flow passage 3 is formed, for example, such that the air, which has been taken in from the inlet 10, flows around to be discharged from the discharge port 11. A dust discharge passage 12, which makes dust contained in the taken-in air flow straight and through which the dust is discharged, branches from the internal flow passage 3.

Figure 3A:
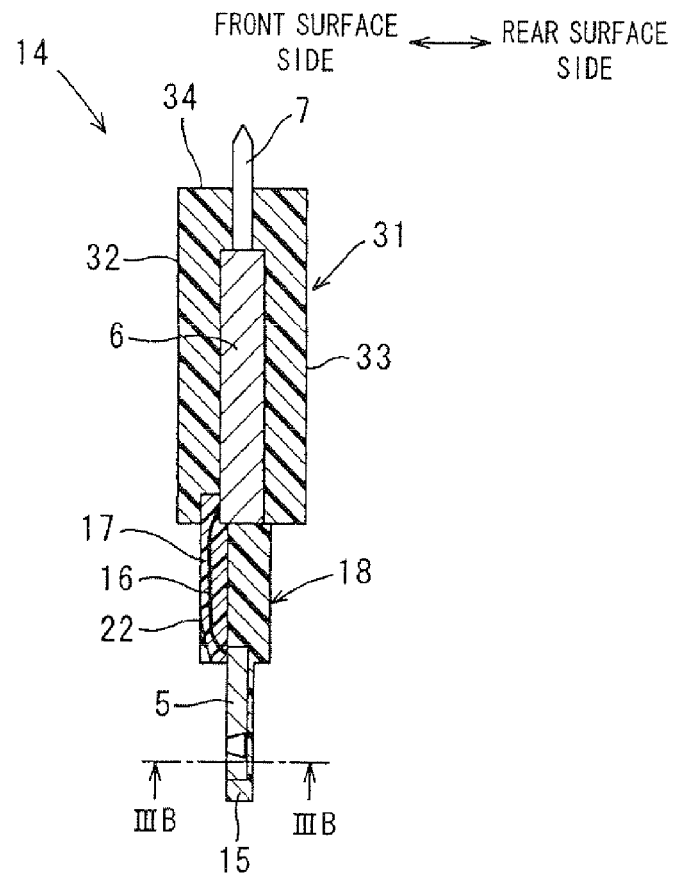
FIG. 3A is a sectional view illustrating a sensor assembly in accordance with the embodiment.
Figure 3B:
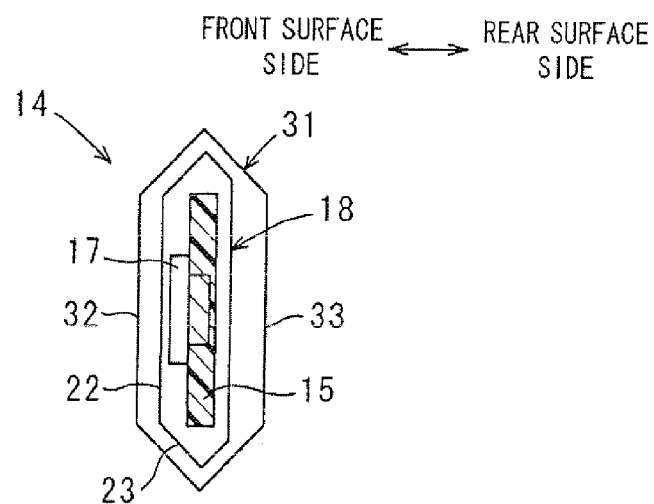
FIG. 3B is a cross-sectional view taken along a line IIIB-IIIB in FIG. 3A.
Figure 4A:
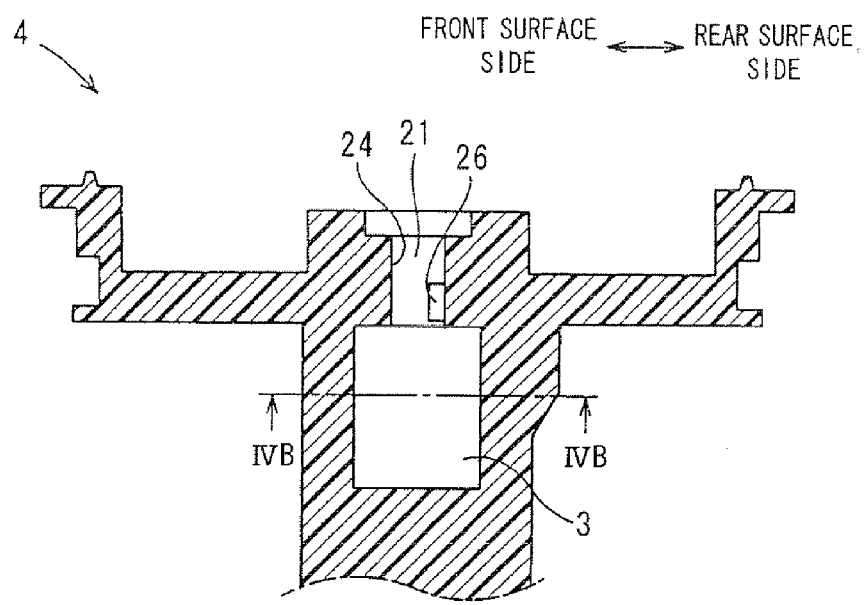
FIG. 4A is a sectional view illustrating a housing in accordance with the embodiment.
Figure 4B:
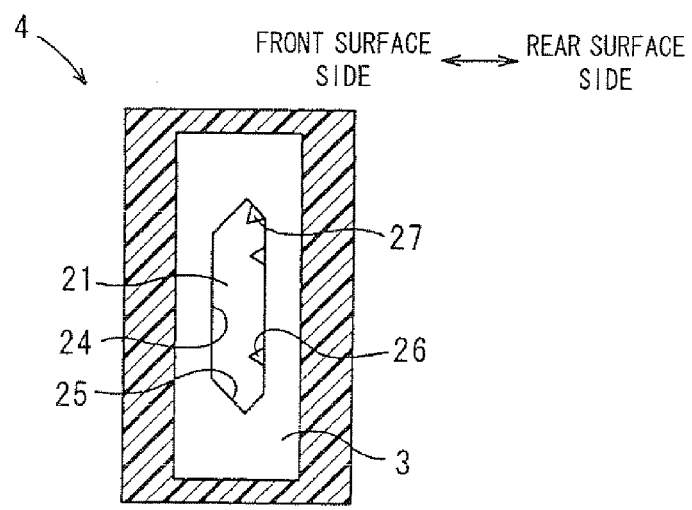
FIG. 4B is a cross-sectional view taken along a line IVB-IVB in FIG. 4A.

The sensor chip 5, the circuit chip 6, the external terminal 7, and so forth, are assembled for a sensor assembly 14 as one component (see FIGS. 3A and 3B). The sensor assembly 14 is inserted and fixed in the housing 4 such that the sensor chip 5 is exposed to the internal flow passage 3. In the assembly of the sensor assembly 14, the circuit chip 6 and the external terminal 7 are incorporated into the sensor assembly 14 by insert molding, and the sensor chip 5 is fixed to a holding portion 15 formed at the time of insert molding by an adhesive, so that the chip 5 is incorporated into the sensor assembly 14.

In addition, the sensor chip 5 and the circuit chip 6 include various kinds of elements (not shown) made of a semiconductor film; and through the energization of these elements, for example, the chips 5, 6 carry out generation of a heat transfer phenomenon with air, and generation and processing of the electrical signal. The element of the sensor chip 5 and the element of the circuit chip 6 are electrically connected through a bonding wire 16. The bonding wire 16 is covered with and protected by a potting material 17. The wire 16 constitutes a bonding part 18, which electrically connects the sensor chip 5 and the circuit chip 6, together with a resin part formed at the time of insert molding.

Characteristics of the air flow rate measuring device 1 in accordance with the embodiment will be described with reference to FIGS. 1 to 5. The housing 4 includes a hole 21, into which the sensor assembly 14 is fitted. A part of a surface that defines the hole 21 serves as contact surfaces 24, 25 that are in surface contact respectively with contact surfaces 22, 23 formed on the sensor assembly 14. The contact surfaces 22, 23 are non-parallel to each other, and the contact surfaces 24, 25 are also non-parallel to each other.

Ribs 26, 27 are formed respectively on a surface portion of the surface portion that defines the hole 21 that is opposed to the contact surfaces 24, 25. The sensor assembly 14 is press-fitted into the hole 21 to be pressed against leading ends of the ribs 26, 27 and the contact surfaces 24, 25. The ribs 26, 27 function as an urging mechanism that presses the contact surfaces 22, 23 on the contact surfaces 24, 25, and the sensor assembly 14 is fixed to the housing 4 by the pressing by the ribs 26, 27.

The contact surfaces 22, 23 are provided for the bonding part 18. The urging force by the ribs 26, 27 is applied to the bonding part 18 mainly in a direction from a rear surface side toward a front surface side. The front surface side and the rear surface side are defined based on an assumption that a surface of an outer arrangement part 31, on which the element of the sensor chip 5 or the circuit chip 6 is provided, is regarded as a front surface and that a surface of the outer arrangement part 31, on which the element is not provided, is regarded as a rear surface.

A sealing agent 30 that maintains airtightness of the internal flow passage 3 exists between the sensor assembly 14 and the housing 4, and the sealing agent 30 is an elastic adhesive. The elastic adhesive is, for example, an adhesive having elasticity which can absorb a linear expansion difference between two objects that are bonded together to such an extent that a linear expansion generated in one object of the two objects is not transmitted to the other object. Specifically, this elastic adhesive is, for example, an adhesive that consists primarily of a silicone-series high polymer.

A part of the sensor assembly 14 that includes the circuit chip 6 and the external terminal 7 is disposed outside the housing 4, and serves as the outer arrangement part 31. The outer arrangement part 31 is plate-shaped, and extends in one surface direction. The outer arrangement part 31 includes a front surface 32 and a rear surface 33, which are parallel to this surface direction, and a peripheral edge 34 that demarcates a spread of the front surface 32 and the rear surface 33 in the surface direction.

Figure 5:
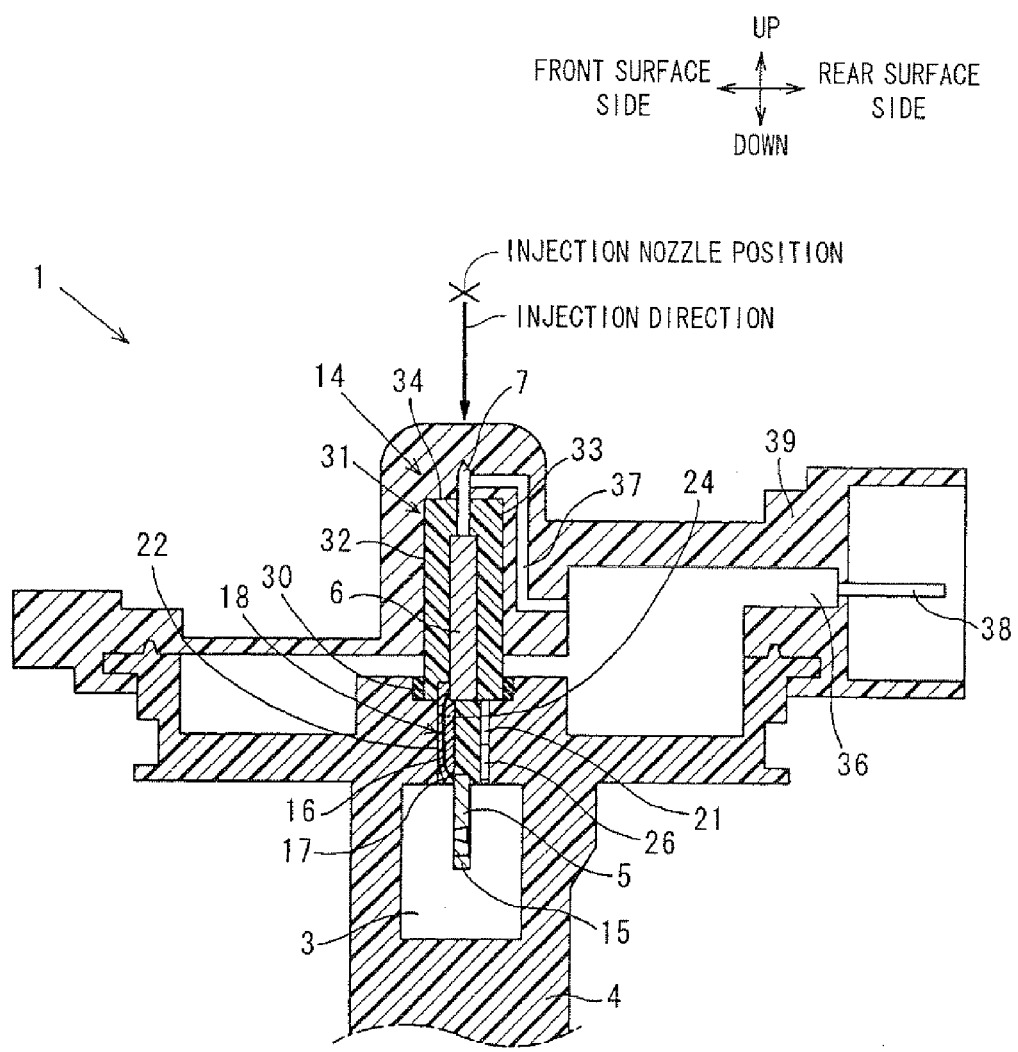
FIG. 5 is a sectional view illustrating electrical connection between the sensor assembly and a terminal assembly in accordance with the embodiment.

The outer arrangement part 31 is integrated, for example, with the housing 4 and terminal assembly 36 via a mold part 39 that is formed by resin molding (see FIG. 5). The terminal assembly 36 includes terminals 37, 38 for outputting the electrical signal to the ECU, and the external terminal 7 and the terminal 37 are electrically connected by the mold part 39.

A position of an injection nozzle and an injection direction of molten resin at the time of the formation of the mold part 39 are set, such that the injected molten resin flows along the front surface 32 and the rear surface 33 after the injected molten resin collides only with the peripheral edge 34 without colliding with the front surface 32 or the rear surface 33. More specifically, given that upper and lower directions are set as illustrated in FIG. 5, the injection nozzle for the molten resin is set, for example, immediately above a part of the peripheral edge 34, into which the external terminal 7 projects. The injection direction is set at a direction toward immediately below, for example.

Effects of the embodiment will be described. In the air flow rate measuring device 1, the contact surfaces 22, 23 provided for the sensor assembly 14 are in surface contact respectively with the contact surfaces 24, 25 provided for the housing 4; and the contact surfaces 22, 23 are pressed respectively against the contact surfaces 24, 25 by the ribs 26, 27.

Accordingly, the sensor assembly 14 and the housing 4 are fixed together as a result of the contact surface 22 and the contact surface 24 being pressed against each other; and the contact surface 23 and the contact surface 25 being pressed against each other. Therefore, the linear expansion is no longer transmitted from the housing 4 to the sensor assembly 14. Consequently, the transmission of linear expansion is blocked between the sensor assembly 14 and the housing 4, so that a stress caused by the linear expansion difference (stress generated due to a difference in linear expansion between the sensor assembly 14 and the housing 4) cannot be applied to the sensor chip 5 or the circuit chip 6; and a fluctuation of a resistance value of the element of the sensor chip 5 or the circuit chip 6 can be limited.

The sensor assembly 14 is fixed to the housing 4 as a result of the assembly 14 being in surface contact with the housing 4 at two places of the contact surfaces 22, 23. Accordingly, accuracy of position of the sensor assembly 14 relative to the housing 4 can be improved. The sensor assembly 14 is fixed to the housing 4, urged by the ribs 26, 27. Thus, the urging mechanism that presses the contact surfaces 22, 23 respectively on the contact surfaces 24, can be easily provided.

The contact surfaces 22, 23 of the sensor assembly 14 are formed at the bonding part 18, and the bonding part 18 is urged by the ribs 26, 27 to be fixed to the housing 4. Accordingly, a stress generated by the urging mechanism (a stress generated in the sensor assembly 14 by pressing the sensor assembly 14 against the housing 4 through the urging mechanism) is caused at the bonding part 18. Therefore, generation of the stress by the urging mechanism at the sensor chip 5 or the circuit chip 6 is prevented, so that the fluctuation of the resistance value of the element of the sensor chip 5 or the circuit chip 6 due to the stress by the urging mechanism can be prevented.

The sealing agent 30 that maintains airtightness in the internal flow passage 3 is located between the sensor assembly 14 and the housing 4, and the sealing agent 30 is an elastic adhesive. By the use of an elastic adhesive for the sealing agent 30, the transmission of linear expansion between the sensor assembly 14 and the housing 4 via the sealing agent 30 can be mitigated. Accordingly, generation of a stress caused by the difference in linear expansion at the sensor assembly 14 can be limited with the airtightness of the internal flow passage 3 maintained by the sealing agent 30.

The outer arrangement part 31 is plate-shaped, and has one surface direction. In addition, the outer arrangement part 31 is integrated with the housing 4 and the terminal assembly 36 by the mold part 39. A position of an injection nozzle and an injection direction of molten resin at the time of the formation of the mold part 39 are set, such that the injected molten resin flows along the front surface 32 and the rear surface 33 after the injected molten resin collides only with the peripheral edge 34 without colliding with the front surface 32 or the rear surface 33.

As a result, the outer arrangement part 31 is resin-molded with an injection pressure of the molten resin applied generally evenly to (the front surface 32 and the rear surface 33 of) the outer arrangement part 31. Thus, generation of a stress caused by the resin molding (a stress generated by resin-molding the outer arrangement part 31) at the sensor assembly 14 can be curbed.

Modifications of the above embodiment will be described. The mode of the air flow rate measuring device 1 is not limited to the above-described embodiment, and various modifications may be made to the mode of the air flow rate measuring device 1. For example, in the air flow rate measuring device 1 of the embodiment, the sensor assembly 14 is in surface contact with the housing 4 at two places or more, so that the sensor assembly 14 is fixed to the housing 4. Alternatively, the sensor assembly 14 may be in surface contact with the housing 4 at three places or more to be fixed to the housing 4. In the air flow rate measuring device 1 of the embodiment, the ribs 26, 27 are used for the urging mechanism. Alternatively, a spring or the like may be employed as the urging mechanism.

Additional advantages and modifications will readily occur to those skilled in the art. The invention in its broader terms is therefore not limited to the specific details, representative apparatus, and illustrative examples shown and described.

What is claimed is:

1. An air flow rate measuring device adapted to be disposed in an intake passage leading to an engine, for taking in a part of air flowing through the intake passage and generating a heat transfer phenomenon between the device and the air taken in thereby to measure a flow rate of air suctioned into the engine, the device comprising:
   a housing that defines an internal flow passage, through which the air taken in passes, and that includes a contact surface;
   a sensor assembly that includes:
   a sensor chip that is configured to generate an electrical signal through the heat transfer phenomenon, wherein the sensor assembly is inserted and fixed in the housing such that the sensor chip is exposed to the internal flow passage; and
   a contact surface that is in surface contact with the contact surface of the housing; and
   an urging mechanism that is configured to press the contact surface of the sensor assembly which is on a sensor chip-side against the contact surface of the housing from a rear surface-side of the sensor chip, so that the sensor assembly is fixed to the housing by the urging mechanism, wherein:
   the housing further includes a hole, into which the sensor assembly is fitted;
   a part of a surface of the housing that defines the hole serves as the contact surface of the housing;
   a part of the surface of the housing that defines the hole serves as the urging mechanism; and
   the sensor assembly is press-fitted into the hole by the urging mechanism to be in press contact with a leading end of the urging mechanism and the contact surface of the housing.

2. The air flow rate measuring device according to claim 1, wherein:
   the sensor assembly further includes:
   a circuit chip that is configured to process the electrical signal; and
   a bonding part that electrically connects the sensor chip and the circuit chip together; and
   the contact surface of the sensor assembly is formed on the bonding part.

3. The air flow rate measuring device according to claim 1, wherein:
   the contact surface of the sensor assembly is one of a plurality of contact surfaces of the sensor assembly;
   the contact surface of the housing is one of a plurality of contact surfaces of the housing; and
   the sensor assembly is in surface contact with the housing at a plurality of places so as to be fixed to the housing.

4. The air flow rate measuring device according to claim 1, further comprising a sealing agent between the housing and the sensor assembly, wherein the sealing agent is an elastic adhesive and configured to maintain airtightness in the internal flow passage.

5. The air flow rate measuring device according to claim 1, wherein:
   the sensor assembly further includes an outer arrangement part that is outside the housing;
   the outer arrangement part has a shape of a plate and extends in a single surface direction;
   the outer arrangement part includes:
   a front surface and a rear surface, which are parallel to the surface direction; and
   a peripheral edge that demarcates extension of the front surface and the rear surface in the surface direction;
   the outer arrangement part is resin-molded by injection of molten resin through an injection nozzle, to be integrated with another member; and
   a position of the injection nozzle and an injection direction of the molten resin at a time of resin-molding of the outer arrangement part are set, such that the injected molten resin flows along the front surface and the rear surface, after the injected molten resin collides only with the peripheral edge without colliding with the front surface or the rear surface.

6. An air flow rate measuring device adapted to be disposed in an intake passage leading to an engine, for taking in a part of air flowing through the intake passage and generating a heat transfer phenomenon between the device and the air taken in thereby to measure a flow rate of air suctioned into the engine, the device comprising:
   a housing that defines an internal flow passage, through which the air taken in passes, and that includes a contact surface;
   a sensor assembly that includes:
   a sensor chip that is configured to generate an electrical signal through the heat transfer phenomenon, wherein the sensor assembly is inserted and fixed in the housing such that the sensor chip is exposed to the internal flow passage; and
   a contact surface that is in surface contact with the contact surface of the housing; and
   an urging mechanism that is configured to press the contact surface of the sensor assembly which is on a sensor chip-side against the contact surface of the housing from a rear surface-side of the sensor chip, so that the sensor assembly is fixed to the housing by the urging mechanism, wherein:
   the housing further includes a hole, into which the sensor assembly is fitted;
   a part of a surface of the housing that defines the hole serves as the contact surface of the housing;
   a part of the surface of the housing that defines the hole serves as the urging mechanism;
   the sensor assembly is press-fitted into the hole by the urging mechanism to be in press contact with a leading end of the urging mechanism and the contact surface of the housing;
   the sensor assembly further includes:
   a circuit chip that is configured to process the electrical signal; and
   a bonding part that electrically connects the sensor chip and the circuit chip together; and
   the contact surface of the sensor assembly is formed on the bonding part.

7. The air flow rate measuring device according to claim 6, wherein:
   the contact surface of the sensor assembly is one of a plurality of contact surfaces of the sensor assembly;
   the contact surface of the housing is one of a plurality of contact surfaces of the housing; and
   the sensor assembly is in surface contact with the housing at a plurality of places so as to be fixed to the housing.

8. The air flow rate measuring device according to claim 6, further comprising a sealing agent between the housing and the sensor assembly, wherein the sealing agent is an elastic adhesive and configured to maintain airtightness in the internal flow passage.

9. The air flow rate measuring device according to claim 6, wherein:
- the sensor assembly further includes an outer arrangement part that is outside the housing;
- the outer arrangement part has a shape of a plate and extends in a single surface direction;
- the outer arrangement part includes:
- a front surface and a rear surface, which are parallel to the surface direction; and
- a peripheral edge that demarcates extension of the front surface and the rear surface in the surface direction;
- the outer arrangement part is resin-molded by injection of molten resin through an injection nozzle, to be integrated with another member; and
- a position of the injection nozzle and an injection direction of the molten resin at a time of resin-molding of the outer arrangement part are set, such that the injected molten resin flows along the front surface and the rear surface, after the injected molten resin collides only with the peripheral edge without colliding with the front surface or the rear surface.

* * * * *